Dec. 31, 1935.   P. R. WHEELER   2,026,152
CONTROL SYSTEM FOR TRANSMISSIONS
Filed March 17, 1932   4 Sheets-Sheet 1
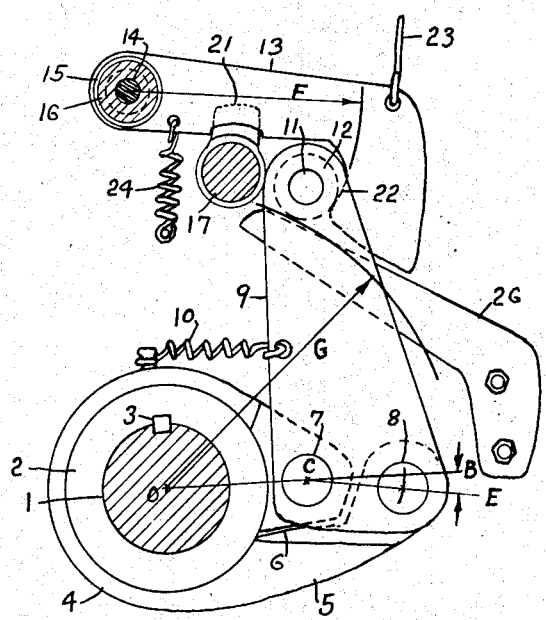
Fig. I  (View A-A)
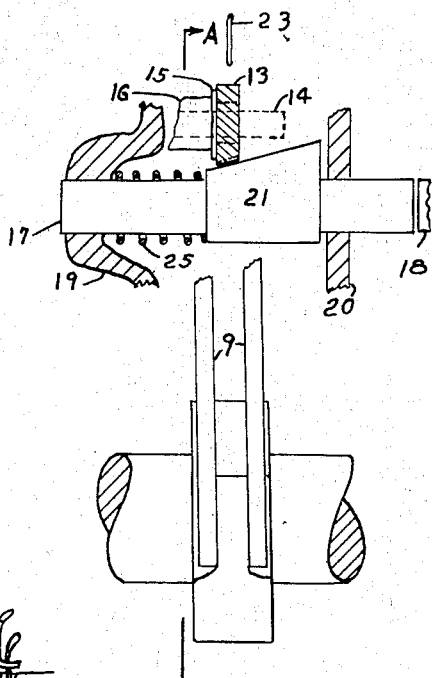
Fig. II
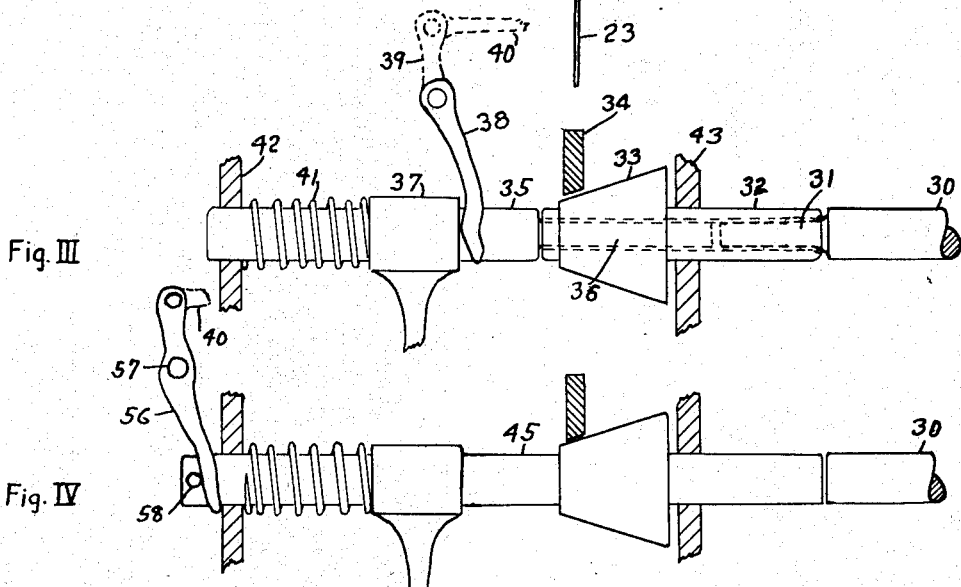
Fig. III
Fig. IV
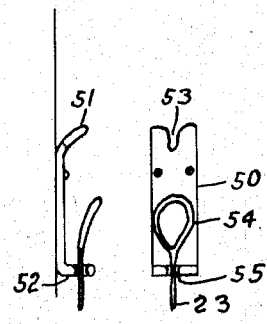
Fig. V
Inventor
Phillip R. Wheeler Dec. 31, 1935.    P. R. WHEELER    2,026,152
CONTROL SYSTEM FOR TRANSMISSIONS
Filed March 17, 1932    4 Sheets-Sheet 2
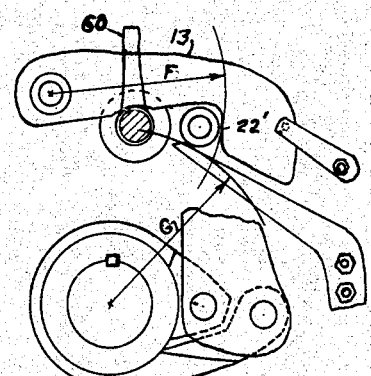
Fig. VI
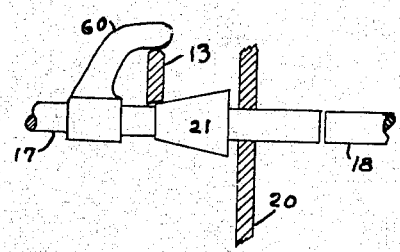
Fig. VII
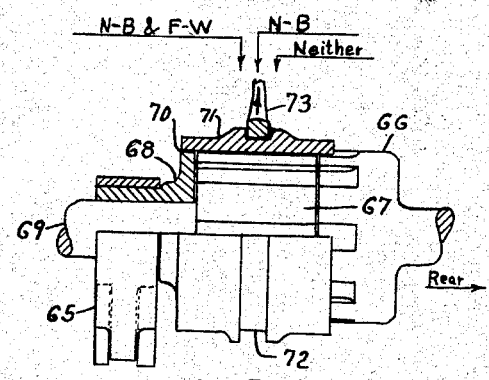
Fig. VIII
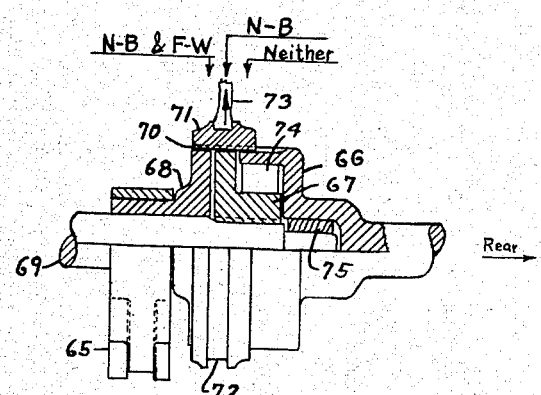
Fig. IX
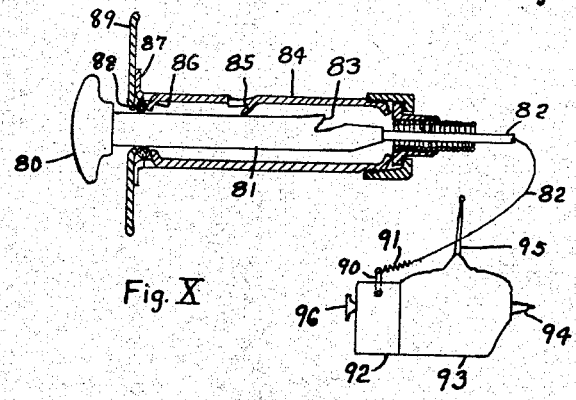
Fig. X
Inventor
Phillip R. Wheeler Dec. 31, 1935.　　　　　　　P. R. WHEELER　　　　　　2,026,152
CONTROL SYSTEM FOR TRANSMISSIONS
Filed March 17, 1932　　　　　4 Sheets-Sheet 3
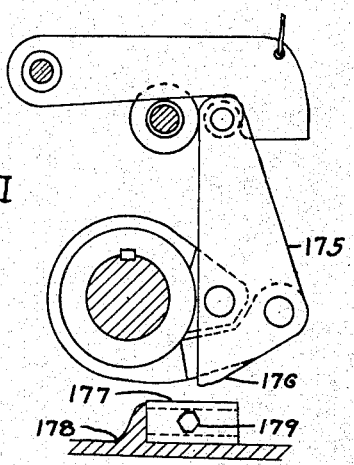
Fig. XI
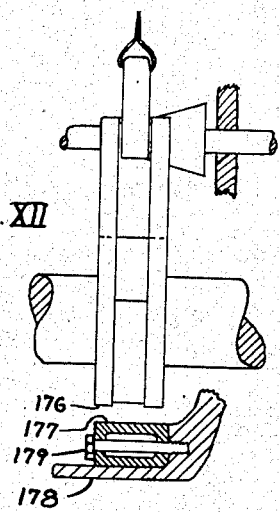
Fig. XII
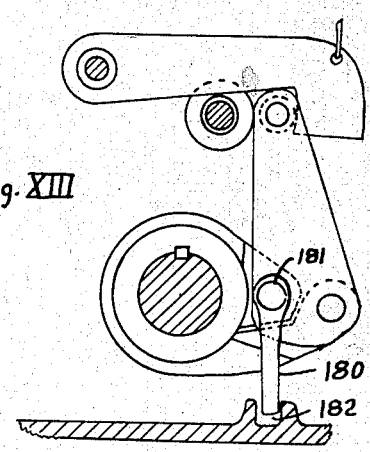
Fig. XIII
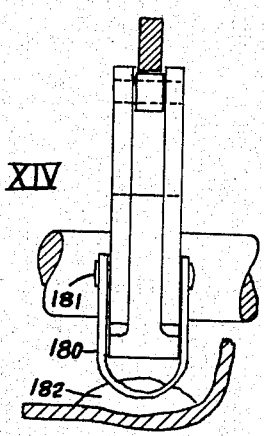
Fig. XIV
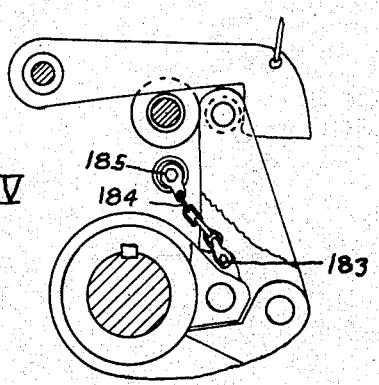
Fig. XV
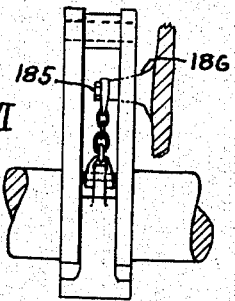
Fig. XVI
Inventor
Phillip R. Wheeler Dec. 31, 1935.  P. R. WHEELER  2,026,152
CONTROL SYSTEM FOR TRANSMISSIONS
Filed March 17, 1932  4 Sheets-Sheet 4
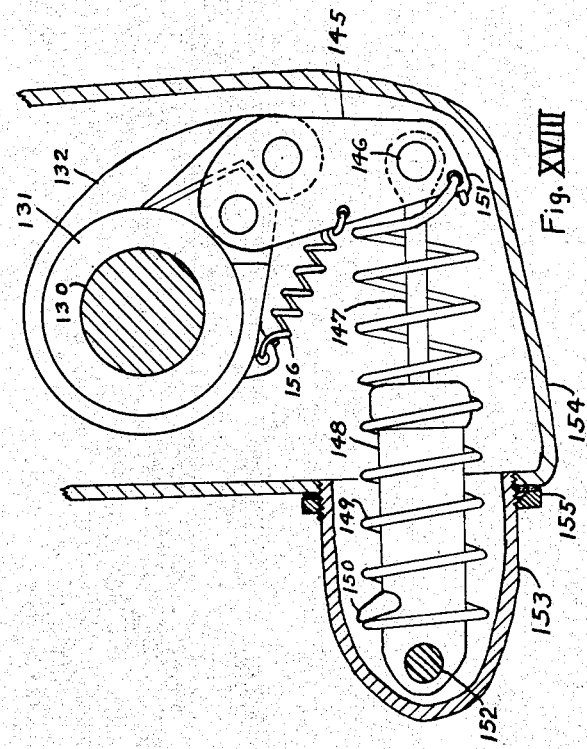
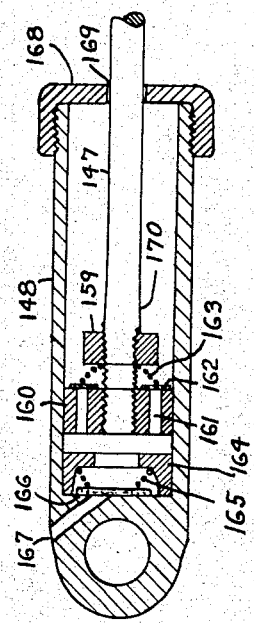
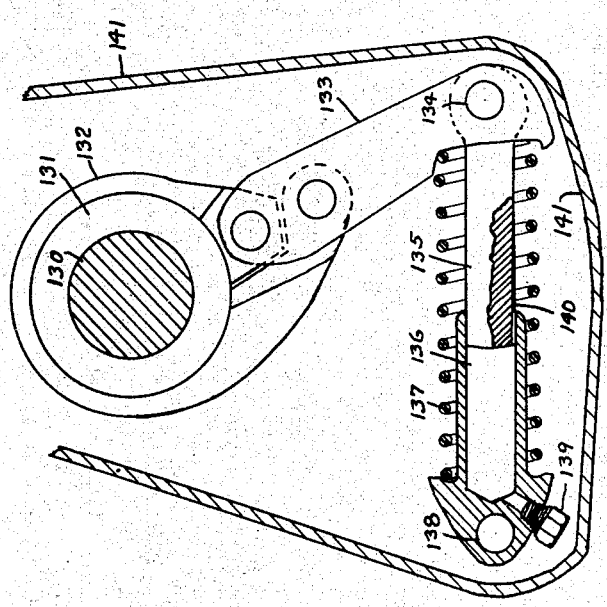
Inventor
Phillip R. Wheeler Patented Dec. 31, 1935

2,026,152

UNITED STATES PATENT OFFICE 2,026,152

CONTROL SYSTEM FOR TRANSMISSIONS

Phillip R. Wheeler, Alexandria, Va.

Application March 17, 1932, Serial No. 599,515

22 Claims. (Cl. 192—4)

The object of this invention is to provide a no-back device for use in combination with gear transmissions and free-wheeling units.

A further object is to provide control systems for the above mentioned combinations.

A further object is to provide a no-back which can at any and all times be released; that is, even while the no-back is holding the car on a grade it can be easily disengaged so as to allow the car to back up.

Figure I is an end view of a clamp ring type of no-back unit.

Figure II is a partial side view of Figure I.

Figure III shows a side view of one system of control for a gear transmission, the no-back unit shown in Figures I and II, and a free-wheeling unit.

Figure IV shows a side view of another system of control for a gear transmission, the no-back unit of Figures I and II and a free-wheeling unit.

Figure V shows two views of a manual lock out control which may be used with the no-back of Figures I and II.

Figure VI is an end view of a modification of Figure I.

Figure VII is a partial side view of Figure VI.

Figure VIII is a partially sectioned side view of a combined spring type of free-wheeling unit and a clamp ring type of no-back unit of the type shown in Figures XVII and XVIII.

Figure IX is a partially sectioned side view of a roller type of free-wheeling unit combined with a no-back unit similar to that used in Figure VIII.

Figure X shows a side sectional view of a dash lock out control for the free-wheeling and no-back units such as shown in Figures VIII, IX, XVII, and XVIII.

Figure XI shows an end view of a clamp ring no-back similar to the one shown in Figure I, but with a different means for causing the release of the clamp ring.

Figure XII is a side view of Figure XI.

Figure XIII is an end view of a clamp ring no-back showing still another means of releasing the clamp ring.

Figure XIV is a partial side view of Figure XIII.

Figure XV shows still another means of causing a clamp ring no-back to release.

Figure XVI is a partial side view of Figure XV.

Figure XVII shows an end view of a no-back unit having a hydraulic connection permitting a limited backward movement.

Figure XVIII shows an end view of a modification of Figure XVII.

Figure XIX shows an enlarged sectional view of a hydraulic control member used in Figure XVIII.

Referring to Figure I, a portion of a drive shaft is shown at 1, this having a ring 2 secured to it by means of the key 3. A clamp ring 4 surrounds the ring. The clamp ring has the projection 5 which is cut by the slot 6. The pins 7 and 8 pass through the clamp ring on opposite sides of the slot 6. These pins carry the two lever arms 9.

The hole carrying the pin 7 is shown on the line OB, drawn through the center of the clamp ring circle. The hole 8 is removed from this diameter by the amount of the angle BCE. This angle BCE will normally be chosen between 2 and 10 degrees, depending upon the length of the lever arms 9, on the contact surface of the clamp ring and its inner ring and on operating conditions. An angle of from 5 to 8 degrees has been found to be generally satisfactory. The spring 10 connected between the lever arm and the clamp ring as shown serves to keep a certain amount of initial tension on the clamp ring. The lever arms 9 have the pin 11 secured in their ends, this pin carrying the roller 12. The crooked arm 13 is secured to the housing by means of the pin or bolt 14. The bolt or pin has a washer 15 and a spacer 16. At 17 is shown a slidable rod which has its end next to the end of a gear transmission low-and-reverse shifter rod, the end of this shifter rod being shown at 18.

The rod is slidably supported by the two parts 19 and 20. The rod also carries the cam 21, this being designed to engage the arm 13 and lift its crooked end clear of the roller 12. The surface engaging the roller is an arc about the pin 14, as shown by the line F and the arc described as an extension of the engaging surface 22. The wire or other connection 23 is designed to serve as a lockout or release for the no-back unit. The end (not shown) is made accessible from the dash or floor of the car. See Figure III. The spring 24 serves to help return the crooked arm after it has been lifted, and the spring 25 returns the rod 17 and the cam 21.

The release bar 26 is secured to the housing by bolts or other means so that it is substantially tangent to a circle arc drawn with the radius G. A slight amount of clearance is left between the bar and the roller 12, so that in the locked position, as shown, the roller does not touch the bar.

Operation

The shaft 1 normally turns counter clockwise, as viewed in Figure I. The ring 2 turns inside the clamp ring 4, the latter relieving so that the shearing of the oil film beneath it is the only resistance offered to the turning of the shaft and the ring. The slight friction between the clamp ring and the inner ring or sleeve keeps the end of the lever 9 pushed against the rod 17. This tends to spread the clamp ring so that it is always loose when the shaft turns counter clockwise.

If the car is stopped on an up grade and tends to slide backwards, the roller at the end of the lever exerts a pressure on the surface 22 and locks the clamp ring upon the ring 2. This normally locks without any relative movement between the clamp ring and the shaft. When the shaft is stopped the oil film is kept squeezed from beneath the clamp ring surface by the spring 10 so that as soon as a slight backward tendency exerts a pressure between the roller and the face 22, the clamp ring positively locks. The greater the pressure exerted the greater the clamping action and, as friction varies nearly directly as the pressure, the clamp ring will not slip.

The clamping action is produced partly by the lever and partly by the location of the pins 7 and 8. The pin 8 is a little behind 7, so that it tends to ride up on the circle arc drawn with C as a center and a radius equal to the distance between the centers 7 and 8. This causes an inward pressure on 7 and an outward pressure on 8. The clamping action of the lever is thus multiplied several times, depending upon the smallness of the angle. The cotangent of the angle BCE gives the amount of the increase in clamping action.

When going into reverse, the low and reverse shifter rod 18 hits the end of the rod 17, moving this and the cam 21 to the left. The cam 21 lifts the arm 13 so that its crooked end clears the roller 12, allowing the lever and clamp ring to move in a clockwise direction. After a slight movement, the roller comes in contact with the release bar 26 and is carried outward as shown by the relation of the circle arc drawn with radius G and the upper side of the release bar. This outward movement of the lever end causes the clamp ring to be spread open so that it releases and allows a free clockwise rotation of the shaft.

The roller 12 stops under the hook end of the stop arm 13, holding it in its raised position after the shift from reverse to neutral has been made, and the rod 17 and cam 21 have been returned to the position shown. As soon as the shaft 1 makes a slight forward movement, counter clockwise, the roller 12 is carried from under the end of the hook, the arm 13 drops down and the hook again engages the roller.

Referring to Figure III, the end of a low and reverse shifter rod is shown at 30. This has an end 31 of reduced size which fits slidably into the hollow rod 32. The rod 32 carries the cam 33, which is either made integral or securely fastened to it. The arm 34, shown in section, corresponds to the arm 13 in Figure 1. The rod 35 has an end 36 of reduced size which fits slidably into the rod 32. The yoke or fork 37 (partially shown) for operating the free-wheeling lock-out is securely fastened to the rod 35. Another fork, 38, fits over 35 so as to have a bearing on the end of 37. The fork 38 is attached to a rod going through the housing and having an arm 39 connected to a free-wheeling lock-out control. The spring 41 serves to return the rod 35 and yoke 37. A part of the housing 42 slidably supports the end of the rod 35 and serves as an abutment for the end of the spring 41. Another portion of the housing, 43, slidably supports the rod 32.

In Figures III and IV, neither the gear transmission, the free-wheeling unit nor the no-back unit is shown, except as regards their relative positions and relations to the controls. Gear transmissions and free-wheeling units are well known to the art and the type of no-back represented by the control is shown in Figures I and II. It is felt that a further detailing of the elements would only encumber the application, and accordingly, for the sake of clearness and conciseness, such detailing is omitted.

Operation of Figure III: The control elements, in the position shown, represent a neutral position of the low and reverse shifter rod, 30, a no-back position for 33 and 34, and a free-wheeling position for 35 and 37. When shifting into low, the rod 30 would slide ahead without disturbing the other elements. When in second or high, the rod 30 would be returned to the position shown. Thus free-wheeling and no-back would be effective in neutral and in all forward speeds.

When shifting to reverse, the rod 30 would move to the left, carrying the other elements with it. The cam 33 would push up the arm 34, releasing the no-back and the yoke 37 would lock-out the free-wheeling unit.

Thus, when shifting from reverse back to neutral, the spring 41 returns the free-wheeling and no-back controls to the position shown so that both are again effective. If at any time it is desired not to use either the free-wheeling or no-back units, these may be locked out with separate lock out controls now used, such as levers, buttons on the dash, or foot controls. A portion of a connection leading to the free-wheeling lock-out control is shown at 40. When a pull is exerted on this connection, 35 and 37 will be carried to the left, locking out the free-wheeling unit. This may then be left locked out until it is desired to use it again.

The no-back is not affected by the free-wheeling lock-out control, but remains effective unless in reverse gear or locked out by the separate lock-out control. This lock-out control may be of any of the types mentioned above for the free-wheeling unit or may be of the type shown in Figure V, this being mounted as shown above Figure III, either on the floor or a portion of the front seat support. This control connects as shown at 23 in Figure I.

Thus both units may be effective at all times except in reverse, when the gear shift lever locks them out; or either one or both may be separately locked out. The no-back unit would normally be used at all times except when it is desired to push the car by hand as in a garage, while it is being repaired.

In Figure IV, is shown a modified system of control in which the free-wheeling lock-out control locks out both units. Otherwise, all of the parts correspond to those of Figure III and operate the same. The chief difference is that the rods 32 and 35 are combined into the single rod 45. However, a separate no-back lock-out may be used the same as in Figure III. This would make it possible to lock out the no-back and have free-wheeling, but, if the free-wheeling is locked out the no-back also would be locked out.

On the left end of Figure IV is shown another method of connection for the lock-out control. The forked lever, 56, has a stationary pivot 57 and bears against a pin 58 in the end of the rod 45. The connection 46 goes to some form of manual control as mentioned above.

In Figure V, a sheet metal stamping 50 has two bent-out portions 51 and 52. The end 51 has the slot 53 for holding the wire 23 below the loop 54. The end 52 has a hole 55 which guides the wire.

This control may be mounted above the transmission, on the floor of the car or on the support for the front seat as represented in Figure III.

In Figures VI and VII, is shown a no-back unit and control similar in general design to that of Figures I and II. However, the surface 22' of the arm 13, instead of following the arm drawn with the radius F, bends slightly to the outside of the arc as shown. This angle is only a few degrees, but makes it easier to disengage the roller when pressure is being applied. In order to prevent the arm 13 from becoming disengaged, the rod 17 carrying the cam 21 is provided with a hook 60 to cover the top of the arm when it is in the locked position. This hook is secured to the rod 17 and moves to the left with the cam, uncovering 13 so that it may raise to release the roller. The lockout connection for this construction would preferably be similar to that shown in Figure IV.

Referring to Figure VIII, a clamp ring type of no-back and a spring type of free-wheeling unit are shown in combination. The clamp ring of the no-back is shown at 65, the rear or driven portion of the free-wheeling unit at 66, and the front or engine-connected part at 67. The no-back clamp ring has the sleeve 68 freely mounted on the drive shaft 69. The sleeve 68 carries a spline 70 of the same size as the outer surface of the two parts of the free-wheeling unit. The sleeve 71 is splined on the inside and is shown engaging the spline on the three parts. The groove 72 carries the yoke 73. This yoke may be controlled by any of the systems or means shown in my co-pending application, filed Feb. 12, 1932, Serial No. 592,634, entitled "Control systems for transmissions."

The relative position of the control sleeve 71 for different conditions is shown by the arrows.

Referring to Figure IX, the numerals designate the same relative parts as in Figure VIII. The free-wheeling unit of Figure VIII is of the spring type while that of Figure IX is of the roller type. In addition to the parts shown in Figure VIII, Figure IX shows a roller 74, of the free-wheeling unit and a roller bearing 75. In operation, the combination is the same as that of Figure VIII, the arrows designating the conditions for different positions of the control sleeve.

Referring to Figure X, a control button is shown at 80 and the pull rod at 81, this being fastened to the wire 82. The pull rod has the prong 83 for engaging the catch 85, which is stamped out of the metal tube 84. A group of tangs 86 are pressed inwardly on the end, these serving to retain the flexible bushing 88. A flange 87 secures the tube to a portion of the dash 89. A lever 90 controls the no-back lockout or the combined no-back and free-wheeling lockout. The spring 91 connects between the lever and the wire 82. The housing 92 encloses the no-back or the no-back and free-wheeling units. The transmission proper is housed in 93. The shaft 94 connects with the clutch. A gear shift lever is shown at 95, and a flange for connecting to the drive shaft at 96.

This control is for use with the units shown in Figures VIII and IX, or for any of those shown in my co-pending application cited above. Under some conditions, as when the no-back is holding the car on a grade, it would be difficult to shift into reverse, because of the pressure on the splines of the no-back sleeve. It might be desirable in some cases to set the manual control so that the spring 91 exerts a pull on the lockout member. Then if the car is put in low gear and eased slightly ahead, the spring would automatically disengage the no-back, making it possible to back up or go into reverse gear.

Referring to Figure XI, the parts in general correspond to those of Figure I. The lever arm 175, however, has a projection as shown at 176. This projection is designed to engage the surface 177, this occurring when the end of the lever is released and the shaft turns slightly backwards The part 177 is secured to the housing 178 by means of the bolt 179.

When the end of the lever arm is released and the projection 176 hits the surface 177, an opening force is exerted on the clamp ring which causes it to release the shaft. This opening action is produced by an upward pressure on the inside connection between the lever and the clamp ring.

In Figures XIII and XIV, the member 180 is attached to the pin 181 as shown. When the end of the lever is released, the member 180 hits the bottom of the slot 182. This pushes upward on the pin 181 and releases the clamp ring.

In Figures XV and XVI, a pin 183 connects the chain 184 by means of the bolt 185 to the projection 186 which is part of the housing. This chain, in the position shown has some slack in it which is taken up when the end of the lever is released. The chain then tightens, holding the end of the clamp ring to which it is attached. With the end of the lever released, the clamp ring opens slightly as the shaft turns backwards. (Clockwise in the figure.)

Referring to Figure XVII, a portion of a drive shaft is shown at 130, a sleeve at 131 and a no-back clamp ring at 132. A clamp ring lever 133 connects by means of the pin 134 to the plunger 135. This plunger rests in a cylinder 136. The spring 137 surrounds both the cylinder and the plunger and keeps the lever of the clamp ring pushed back to the position shown. The pin 138 holds the end of the cylinder but allows the cylinder to turn about it. The check valve 139 permits a free entry of fluid into the cylinder but does not permit outflow. The tapered groove 140 is cut in the side of the plunger 135 so that, as the plunger enters the cylinder, an increased resistance is offered. A part of the housing is shown at 141.

This hydraulic connection is for use with the no-back of Figures VIII and IX or for the no-back shown in my co-pending application cited above. It is designed to allow a limited backward movement, as might be desirable in parking. For instance, there is a certain amount of give in brakes and tires so that when tightly pushed up against a car in front it tends to follow back for two or three inches. If the no-back caught the car which was attempting to park without allowing any backward movement, the car ahead would cause a pressure on the no-back spline so that it might be difficult to disengage it. This hydraulic connection is designed to let the parking car back up sufficiently to clear the car ahead. The spring 137 does not put any great amount of pressure on the no-back lever, so that as long as the plunger does not go to the bottom of the cylinder, the no-back can be easily disengaged.

Referring to Figure XVIII, the numerals 130, 131, and 132 designate the same parts as in Figure XVII. The lever 145 is connected by means of the pin 146 to the rod 147. This enters the cylinder 148. The spring 149 is held by the projection 150 and secured at the other end at 151. This exerts a pull on the lever tending to pull it towards the cylinder. The cylinder is held by means of the pin 152. A circular housing 153 is threaded into the main housing 154 and held with the lock nut 155. A spring 156 exerts a pull on the lever 145, keeping a small amount of initial tension on the clamp ring.

In Figure XIX is shown an enlarged section of the cylinder 148. The rod 147 has a stop nut 159 and a piston 160. The piston has the holes 161 drilled through it. They are covered by the annular valve 162 which is kept in place by the spring 163. A stop 164 is pressed tightly into the bottom of the cylinder. This holds the spring 165 which presses the inlet valve 166 which covers the port 167. The cap 168 has a small amount of clearance 169. The rod 147 is slightly larger at 170 so that the clearance is reduced as the stop nut nears the cap.

The hydraulic unit just described is designed to offer resistance to pull rather than to push, as is the unit of Figure XVII. In operation, the piston normally keeps the position shown in Figure XIX. When the no-back takes hold the piston will be pulled to the right, forcing the trapped oil out through the clearance space 169. More oil will be sucked in below the piston through the port 167. When the piston returns the oil below it will pass through the hole 161 to the upper side, thus making the unit again ready for operation. It is desirable that both of the above described units should be at least partially immersed in oil at all times.

I claim:

1. In a no-back device for use in combination with transmissions, a clamp ring surrounding a part having connection with the rear wheels, said clamp ring consisting of a circular ring having a projection on one side, the said projection having two holes for connection to a lever the two holes being substantially in line with a diameter of the clamp ring circle, a lever connected by means of the said holes, and a cut between the two holes, severing the said ring, and means to engage the end of the lever to prevent backward movement.

2. Claim 1 and one of said holes being on a line drawn through the center of the clamp ring circle and the other of said holes being slightly displaced from the said line.

3. A shaft, a clamp ring surrounding the shaft, a lever having two lines of connection with the clamp ring, a roller secured to the end of the lever, means for engaging the roller to prevent the backward movement of the clamp ring, means for releasing the roller to allow a backward movement, a second means for engaging the roller, this second said means causing the clamp ring to release.

4. In a no-back device, a shaft, a clamp ring surrounding the shaft, a lever having two lines of connection with the clamp ring, means for engaging the end of the lever to prevent backward movement of the clamp ring, means for releasing the end of the lever to permit a backward movement, and means engaging a portion of the lever, said means causing the clamp ring to release.

5. In a no-back device, a shaft, a clamp ring surrounding the shaft, a lever having two lines of connection with the clamp ring; means for engaging the end of the lever to prevent backward movement of the clamp ring, means for releasing the end of the lever to permit backward movement and means engaging the inside connection between the lever and the clamp ring, said means causing the clamp ring to release.

6. In a no-back device, a shaft, a clamp ring surrounding the shaft, a lever having two lines of connection with the clamp ring, means for engaging the end of the lever to prevent backward movement of the clamp ring, means for releasing the end of the lever to permit backward movement, and means engaging a portion of the clamp ring to cause its release.

7. In a no-back device, a clamp ring, a lever connected to the clamp ring, means for holding the end of the lever, and means for releasing the said end of the lever, the said releasing means permitting a slight backward movement of the lever end.

8. In a no-back device, an inner circular member, an outer clamp ring member, a lever arm for the clamp ring, means releaseably engaging the end of the lever arm and means causing the clamp ring to release when the lever arm end is released.

9. In a no-back device, an inner circular member, a clamp ring fitting over the circular member, a lever arm connected to the ends of the clamp ring, means for holding the end of the lever arm, a means to cause the first named means to release the end of the lever arm and means causing the clamp ring to release when the lever arm end has been released.

10. In a no-back device, a shaft member having parallel sides, a clamp ring fitting over the shaft member, a lever arm for the clamp ring, means for holding the end of the lever arm, means for releasing the end of the lever and other means acting to prevent reverse rotation of the clamp ring but pemitting reverse rotation of the shaft.

11. In a no-back device, a shaft, a one way clutch element surrounding the shaft, a stop for engaging a portion of the clutch element to prevent reverse rotation thereof, means for pivotly connecting the stop to a stationary part, means for rotating the stop to cause the release of the clutch element, the engaging surface of the said stop which holds the clutch element being a circle arc about the pivot axis of the said stop.

12. In a no-back device, a one way clutch having an inner and an outer member, a stop member for engaging one of the members, a pivot connection for securing the stop member to a stationary part, a part on the stop member which is a circle arc about the said pivot connection, this said circle arc part engaging a part on the non-rotating clutch part, and means for causing the stop arm to release the said clutch part.

13. In a no-back device, a one way clutch having a rotary member and a normally stationary member, a stop for engaging a portion of the non-rotating member to secure it against rotation, a pin securing the stop to a stationary part and means for rotating the stop to cause it to release the non-rotating part which it normally holds, and other means then acting to permit reverse rotation of the rotating part.

14. In a no-back device, a one way clutch having a rotary part and a normally stationary part, a stop arm for engaging and holding the stationary part, a roller acting between the stop arm and the engaged part of the said clutch and means for causing the stop arm to release the said clutch part, and other means then acting to permit reverse rotation of the rotary part.

15. In a no-back device, a one way clutch of the clamp ring type, a lever arm for the clamp ring, a stop for engaging the end of the lever arm, means for causing the stop to release the end of the lever arm and a U member acting to hold the clamp ring after the release of the lever end by the stop, the said U member releasing the clamp ring so as to permit reverse rotation of the rotating member.

16. In a no-back device, a shaft member, a clamp ring, a lever arm for the clamp ring, resilient means acting between the lever arm and the clamp ring to produce an initial tension on the ring and means releasably holding the end of the lever arm.

17. In a no-back device, a shaft member, a clamp ring, a lever for the clamp ring, spring means for causing an initial clamping action of the clamp ring on the said shaft member, means for holding the end of the said lever, means for releasing the end of the lever, and means acting to permit reverse movement after the end of the lever has been released.

18. In a no-back device, a clamp ring, a lever connected to the ends of the clamp ring, a stop for holding the lever end, means for releasing the lever end, and means to maintain the lever end released.

19. In a no-back device, a clamp ring, a lever for the clamp ring, a stop for holding the end of the lever, and cam means for causing the stop to release the end of the lever.

20. In a no-back device, a clamp ring, a lever for the clamp ring, pin connections between the lever and the ends of the clamp ring, these connections being substantially in line with a diameter of the clamp ring circle, a roller on the end of the said lever, a stop for engaging the roller, a pin connecting the stop to a stationary part, a surface on the stop for engaging the said roller, the said surface being a circle arc about the said pin connection to the stationary part, means for causing movement of the stop to release the roller, and other means then holding the inside end of the clamp ring.

21. In a no-back device, a shaft member, a clamp ring member, an engaging surface between these two members, the said engaging surface being cylindrical in form and parallel to the shaft axis, a lever arm for the said clamp ring, means releasably engaging the end of the said lever, and other means acting to hold the clamp ring and to cause it to release the said shaft member in reverse direction when the said lever end is released.

22. In a one way brake mechanism, a rotatable member, a one way brake member associated with the said rotatable member, the said one way brake member permitting forward rotation of the rotatable member but normally preventing reverse rotation, a roller secured to a part of the said one way brake member, a stop member, the said roller transmitting torque from the said brake member to the said stop member when the said rotatable member tends to turn in the reverse direction, means to move the said stop member to release the roller, and other means acting to release the one way brake member to permit reverse rotation of the rotatable member.

PHILLIP R. WHEELER.